US012565231B2

(12) United States Patent
Lee et al.

(10) Patent No.: US 12,565,231 B2
(45) Date of Patent: Mar. 3, 2026

(54) AUTONOMOUS DRIVING CONTROL APPARATUS AND METHOD

(71) Applicants: HYUNDAI MOTOR COMPANY, Seoul (KR); KIA CORPORATION, Seoul (KR)

(72) Inventors: Dong Hwi Lee, Seongnam-si (KR); Chang Young Jung, Seoul (KR); Keon Chang Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 161 days.

(21) Appl. No.: 18/536,749

(22) Filed: Dec. 12, 2023

(65) Prior Publication Data

US 2025/0042434 A1 Feb. 6, 2025

(30) Foreign Application Priority Data

Jul. 31, 2023 (KR) ........................ 10-2023-0099889

(51) Int. Cl.
*B60W 10/20* (2006.01)
*B60W 60/00* (2020.01)
*B62D 6/10* (2006.01)

(52) U.S. Cl.
CPC .......... *B60W 60/001* (2020.02); *B60W 10/20* (2013.01); *B60W 60/0053* (2020.02);
(Continued)

(58) Field of Classification Search
CPC .............. B60W 60/001; B60W 10/20; B60W 2520/12; B60W 2540/00;
(Continued)

(56) References Cited

U.S. PATENT DOCUMENTS 5,636,121 A * 6/1997 Tsuyama ................ B62D 7/159
180/197
6,000,491 A * 12/1999 Shimizu ................. B62D 1/166
74/498
(Continued)

FOREIGN PATENT DOCUMENTS

CN 110891849 B * 11/2021 ........... B62D 15/025
DE 112015000480 T5 * 11/2016 ............. B62D 1/286
(Continued)

OTHER PUBLICATIONS

"Intelligent Electric Power Steering: Artificial Intelligence Integration Enhances Vehicle Safety and Performance;" Vyas et al., ARXIV ID: 2412.08133; Dec. 11, 2024. (Year: 2024).*
(Continued)

*Primary Examiner* — Spencer D Patton
*Assistant Examiner* — Jorge O Peche
(74) *Attorney, Agent, or Firm* — Lempia Summerfield Katz LLC

(57) ABSTRACT

Disclosed is an autonomous driving control apparatus which includes a steering device, a memory, and a controller. The autonomous driving control apparatus determines a user required torque received through the steering device, while controlling a host vehicle based on a required steering angle, determines a torque sensor value corresponding to the user required torque, using the steering device, adjusts an amount of control attenuation about a usage ratio between the required steering angle and the user required torque, based on the torque sensor value, and performs steering control of the host vehicle, based on at least one of the required steering angle, the user required torque, or the amount of control attenuation, or any combination thereof.

20 Claims, 6 Drawing Sheets

(52) U.S. Cl.
CPC ........... *B62D 6/10* (2013.01); *B60W 2520/12* (2013.01); *B60W 2540/00* (2013.01)

(58) Field of Classification Search
CPC ..... B60W 30/18145; B60W 2710/202; B60W 10/10; B60W 50/08; B60W 2050/0026; B60W 2510/20; B62D 6/10; B62D 1/286
See application file for complete search history.

(56) References Cited

U.S. PATENT DOCUMENTS

| | | | | |
|---|---|---|---|---|
| 6,154,695 | A * | 11/2000 | Shimizu | B62D 1/286 |
| | | | | 701/41 |
| 8,903,609 | B2 * | 12/2014 | Kim | B62D 5/0409 |
| | | | | 701/41 |
| 9,321,484 | B2 * | 4/2016 | Morotomi | B62D 6/002 |
| 9,637,166 | B2 * | 5/2017 | Tsubaki | B62D 5/0463 |
| 9,764,738 | B2 * | 9/2017 | Nakatsuka | B60W 30/18109 |
| 10,000,235 | B2 * | 6/2018 | Toda | B62D 5/046 |
| 10,336,366 | B2 * | 7/2019 | Kunihiro | B62D 6/003 |
| 10,996,673 | B1 * | 5/2021 | Katzourakis | G05D 1/021 |
| 12,116,020 | B2 * | 10/2024 | Kim | B62D 1/286 |
| 12,240,448 | B2 * | 3/2025 | Handa | B60W 40/02 |
| 12,391,243 | B2 * | 8/2025 | Hamaguchi | B62D 15/0265 |
| 2001/0054519 | A1 * | 12/2001 | Nishiwaki | B62D 1/286 |
| | | | | 180/446 |
| 2002/0013647 | A1 * | 1/2002 | Kawazoe | B60W 30/18145 |
| | | | | 180/443 |
| 2003/0050748 | A1 * | 3/2003 | Iwazaki | B62D 1/286 |
| | | | | 180/443 |
| 2003/0055546 | A1 * | 3/2003 | Demerly | B62D 6/008 |
| | | | | 180/443 |
| 2004/0019417 | A1 * | 1/2004 | Yasui | B60T 8/172 |
| | | | | 701/80 |
| 2005/0065697 | A1 * | 3/2005 | Niino | B60T 8/17616 |
| | | | | 180/408 |
| 2005/0236894 | A1 * | 10/2005 | Lu | B62D 11/08 |
| | | | | 303/139 |
| 2006/0089770 | A1 * | 4/2006 | Ito | B62D 1/286 |
| | | | | 180/443 |
| 2006/0287790 | A1 * | 12/2006 | Seifert | B60G 17/06 |
| | | | | 701/31.4 |
| 2008/0091320 | A1 * | 4/2008 | Sakai | B62D 1/286 |
| | | | | 701/42 |
| 2011/0196579 | A1 * | 8/2011 | Tokimasa | B60W 30/09 |
| | | | | 701/48 |
| 2012/0226417 | A1 * | 9/2012 | Nishikawa | B62D 6/003 |
| | | | | 701/41 |
| 2013/0103264 | A1 * | 4/2013 | Takashima | B62D 5/0472 |
| | | | | 701/41 |
| 2014/0032047 | A1 * | 1/2014 | Voelz | G06V 20/588 |
| | | | | 701/41 |
| 2014/0210456 | A1 * | 7/2014 | Crossman | B60W 30/00 |
| | | | | 324/207.13 |
| 2015/0336587 | A1 * | 11/2015 | Inoue | B60W 10/184 |
| | | | | 701/1 |
| 2016/0016606 | A1 * | 1/2016 | Tsubaki | B62D 6/002 |
| | | | | 701/41 |
| 2016/0046287 | A1 * | 2/2016 | Owen | B60W 10/04 |
| | | | | 701/43 |
| 2016/0207509 | A1 * | 7/2016 | Kida | G08G 1/166 |
| 2017/0008557 | A1 * | 1/2017 | Mitsumoto | B62D 6/003 |
| 2017/0036692 | A1 * | 2/2017 | Kojo | B62D 6/002 |

| | | | | |
|---|---|---|---|---|
| 2017/0066475 | A1 * | 3/2017 | Kudo | B62D 6/10 |
| 2017/0066476 | A1 * | 3/2017 | Kudo | B62D 5/0463 |
| 2017/0087986 | A1 * | 3/2017 | Ujihara | F02D 41/021 |
| 2017/0129480 | A1 * | 5/2017 | Sunahara | B60W 30/18145 |
| 2017/0129481 | A1 * | 5/2017 | Umetsu | B60W 30/045 |
| 2017/0129482 | A1 * | 5/2017 | Sunahara | B60W 30/045 |
| 2017/0327149 | A1 * | 11/2017 | Schneider | B60W 30/143 |
| 2018/0001888 | A1 * | 1/2018 | Takahara | B60W 30/02 |
| 2018/0043877 | A1 * | 2/2018 | Choi | B60W 30/182 |
| 2018/0079406 | A1 * | 3/2018 | Izumi | B60W 10/20 |
| 2018/0186406 | A1 * | 7/2018 | Itou | B62D 5/0463 |
| 2018/0237004 | A1 * | 8/2018 | Nasu | B60K 17/354 |
| 2018/0297631 | A1 * | 10/2018 | Miyatani | B62D 15/025 |
| 2018/0304918 | A1 * | 10/2018 | Kunihiro | B62D 5/0463 |
| 2018/0362070 | A1 * | 12/2018 | Letwin | G05D 1/0066 |
| 2019/0161116 | A1 * | 5/2019 | Moreillon | B62D 15/025 |
| 2019/0210598 | A1 * | 7/2019 | Endo | B62D 15/0285 |
| 2020/0039584 | A1 * | 2/2020 | Igarashi | B62D 1/286 |
| 2020/0064138 | A1 * | 2/2020 | Takahama | G01C 21/30 |
| 2021/0024087 | A1 * | 1/2021 | Kim | B60W 50/14 |
| 2021/0061344 | A1 * | 3/2021 | Kitazume | B62D 1/286 |
| 2021/0323599 | A1 * | 10/2021 | Morino | B62D 6/002 |
| 2021/0354748 | A1 * | 11/2021 | Kunihiro | B62D 6/007 |
| 2021/0380102 | A1 * | 12/2021 | Kim | B60W 10/20 |
| 2022/0009522 | A1 * | 1/2022 | Zhang | B60W 30/12 |
| 2022/0097758 | A1 * | 3/2022 | Kasai | B62D 6/008 |
| 2022/0227417 | A1 * | 7/2022 | Suzuki | B62D 15/0265 |
| 2022/0234582 | A1 * | 7/2022 | Kim | B60W 50/10 |
| 2022/0306187 | A1 * | 9/2022 | Ojima | B60W 60/0051 |
| 2023/0023426 | A1 * | 1/2023 | Hamaguchi | B62D 15/025 |
| 2023/0026238 | A1 * | 1/2023 | Arima | B60T 8/24 |
| 2023/0202465 | A1 * | 6/2023 | Handa | B60W 10/20 |
| | | | | 701/41 |
| 2023/0347926 | A1 * | 11/2023 | Hayakawa | G08G 1/052 |
| 2024/0343300 | A1 * | 10/2024 | Kunihiro | B62D 1/286 |
| 2025/0010857 | A1 * | 1/2025 | Kang | B60W 40/076 |
| 2025/0042434 | A1 * | 2/2025 | Lee | B60W 60/001 |
| 2025/0136141 | A1 * | 5/2025 | Kang | B60W 50/029 |
| 2025/0289497 | A1 * | 9/2025 | Handa | B60W 30/12 |

FOREIGN PATENT DOCUMENTS

| | | | | | |
|---|---|---|---|---|---|
| DE | 102018104473 | A1 * | 10/2018 | | B62D 1/286 |
| JP | 2000033879 | A * | 2/2000 | | |
| JP | 2001219860 | A * | 8/2001 | | |
| JP | 2002012159 | A * | 1/2002 | | |
| JP | 3539362 | B2 * | 7/2004 | | B62D 1/28 |
| JP | 2004268659 | A * | 9/2004 | | B62D 5/046 |
| JP | 3738673 | B2 * | 1/2006 | | |
| JP | 2014054874 | A * | 3/2014 | | |
| JP | 2018144557 | A * | 9/2018 | | B60T 8/17557 |
| JP | 6535482 | B2 * | 6/2019 | | |
| KR | 20180019820 | A * | 2/2018 | | B62D 5/0463 |

OTHER PUBLICATIONS

"Nonlinear Steering Wheel Angle Control Using Self-Aligning Torque with Torque and Angle Sensors for Electrical Power Steering of Lateral Control System in Autonomous Vehicles;" Kim et al., Sensors (Basel, Switzerland), 18(12), 4384; 2018-12-11. (Year: 2018).*

"ADMSV—A Differential Machine Learning based Steering Controller for Smart Vehicles;" Abegaz et al., 2022 IEEE World AI IoT Congress (AIIoT) (2022, pp. 629-634); Jun. 6, 2022. (Year: 2022).*

\* cited by examiner

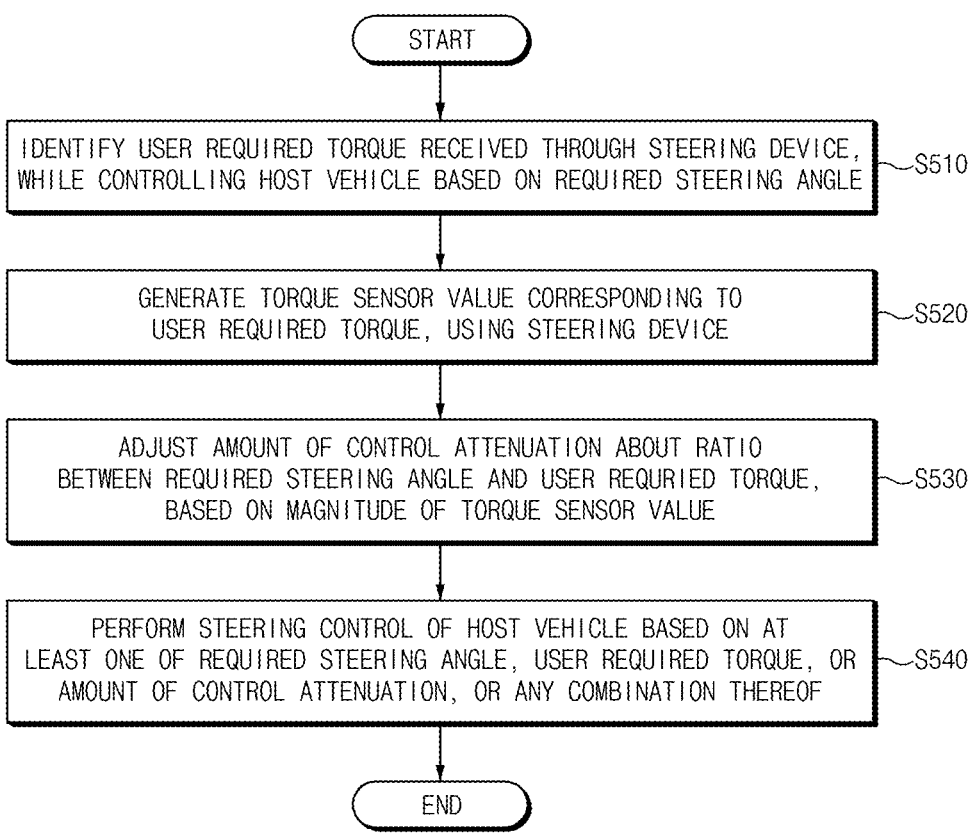

START

IDENTIFY USER REQUIRED TORQUE RECEIVED THROUGH STEERING DEVICE, WHILE CONTROLLING HOST VEHICLE BASED ON REQUIRED STEERING ANGLE ~S510

GENERATE TORQUE SENSOR VALUE CORRESPONDING TO USER REQUIRED TORQUE, USING STEERING DEVICE ~S520

ADJUST AMOUNT OF CONTROL ATTENUATION ABOUT RATIO BETWEEN REQUIRED STEERING ANGLE AND USER REQUIRED TORQUE, BASED ON MAGNITUDE OF TORQUE SENSOR VALUE ~S530

PERFORM STEERING CONTROL OF HOST VEHICLE BASED ON AT LEAST ONE OF REQUIRED STEERING ANGLE, USER REQUIRED TORQUE, OR AMOUNT OF CONTROL ATTENUATION, OR ANY COMBINATION THEREOF ~S540

END

FIG.5

AUTONOMOUS DRIVING CONTROL APPARATUS AND METHOD

CROSS-REFERENCE TO RELATED APPLICATION

This application claims the benefit of and priority to Korean Patent Application No. 10-2023-0099889, filed in the Korean Intellectual Property Office on Jul. 31, 2023, the entire contents of which are incorporated herein by reference.

TECHNICAL FIELD

The present disclosure relates to an autonomous driving control apparatus and a method thereof, and more particularly, relates to technologies of performing steering control of a host vehicle using the amount of control attenuation.

BACKGROUND

The statements in this section merely provide background information related to the present disclosure and may not constitute prior art.

As autonomous vehicles have gradually grown in popularity, various technologies associated with autonomous driving have been developed. Autonomous driving may be divided into partial autonomous driving, conditional autonomous driving, high autonomous driving, and/or full autonomous driving depending on its control level.

Various functions and/or devices for controlling an amount of control for driving control of a host vehicle (e.g., torque for steering control) have been developed among autonomous driving control functions.

In general, a power-assisted steering system, known as power steering, is a system in vehicles designed to reduce the effort (i.e., a steering force) required by the driver to turn the steering wheel and this system also provides the stability of a steering state. Unlike the existing hydraulic scheme that used hydraulic pressure, an electronic power steering system (EPS) for facilitating a steering force of a user using a rotational force of the motor is commonly installed in the vehicle.

Such an EPS is divided into a column-EPS (C-EPS) in a column driving scheme, a rack-EPS (R-EPS) in a rack driving scheme, and the like. The C-EPS is in a form where a drive motor is disposed between a steering wheel and a gearbox and is configured to have a motor installed at an outer side of a steering column to deliver a steering wheel rotation force of a driver to a lower side and rotate a steering shaft in the steering column. The R-EPS is in a form where a drive motor is mounted on a portion (a rack gear) connected with a tie rod and is a scheme showing a similar response to a hydraulic steering system compared to the C-EPS because its mounted position is the same as a position where the existing hydraulic steering system operates.

As an electronic control unit (ECU) drives a motor based on information detected by a vehicle speed sensor, a steering sensor, a torque sensor, and the like, a steering device according to an existing technology actively provides a steering assistance force based on the speed of the vehicle. Such a control scheme may include an assist current map scheme for receiving information of the vehicle and generating torque to be compensated.

However, in a method according to the existing technology, when a user manipulates a steering wheel to intervene in steering control of a host vehicle while the autonomous driving control apparatus performs steering control of the host vehicle, the user may feel a sense of difference because a reaction force occurs through the steering wheel or the like.

Particularly, in a method according to the current technology, when the user attempts to intervene in steering while the autonomous driving apparatus performs steering control based on a required steering angle for the host vehicle, the autonomous control driving apparatus may determine intervention in steering of the user as disturbance. The autonomous driving control apparatus performs steering angle control at stronger intensity, and the user experiences a reaction force due to the steering angle control as a sense of difference.

SUMMARY

The present disclosure has been made to solve the above-mentioned problems occurring in the prior art while advantages achieved by the prior art are maintained intact.

An aspect of the present disclosure provides an autonomous driving control apparatus for adjusting an amount of control attenuation to a specific value within a specified range, when a user required torque is identified while controlling a host vehicle based on a required steering angle.

Another aspect of the present disclosure provides an autonomous driving control apparatus for identifying a torque sensor value corresponding to a user required torque using power steering included in a steering device.

Another aspect of the present disclosure provides an autonomous driving control apparatus for identifying a torque sensor value corresponding to a user required torque by means of a torque map stored in a memory, based on a vehicle speed of a host vehicle and a magnitude of a user required torque.

Another aspect of the present disclosure provides an autonomous driving control apparatus for adjusting an amount of control attenuation to be inversely proportional to a magnitude of a torque sensor value.

Another aspect of the present disclosure provides an autonomous driving control apparatus for providing a function of performing steering control of a host vehicle based on at least one of a required steering angle, a user required torque, or an amount of control attenuation, or an embodiment.

The technical problems to be solved by the present disclosure are not limited to the aforementioned problems, and any other technical problems not mentioned herein should be clearly understood from the following description by those of ordinary skill in the art to which the present disclosure pertains.

According to an aspect of the present disclosure, an autonomous driving control apparatus may include a steering device, a memory storing at least one instruction, and a controller operatively connected with the steering device and the memory. In one embodiment, the at least one instruction may be configured to, when executed by the controller, cause the autonomous driving control apparatus to determine a user required torque received through the steering device, while controlling a host vehicle based on a required steering angle, determine a torque sensor value corresponding to the user required torque, using the steering device, adjust an amount of control attenuation about a usage ratio between the required steering angle and the user required torque, based on the torque sensor value, and perform steering control of the host vehicle, based on at least one of the required steering angle, the user required torque, or the amount of control attenuation, or any combination thereof.

According to an embodiment, the at least one instruction may be configured to, when executed by the controller, cause the autonomous driving control apparatus to determine the torque sensor value corresponding to the user required torque, using power steering included in the steering device.

According to an embodiment, the at least one instruction may be configured to, when executed by the controller, cause the autonomous driving control apparatus to determine a vehicle speed of the host vehicle and determine the torque sensor value by means of a torque map previously stored in the memory, based on the user required torque and the vehicle speed.

According to an embodiment, the at least one instruction may be configured to, when executed by the controller, cause the autonomous driving control apparatus to adjust the amount of control attenuation to be inversely proportional to the torque sensor value.

According to an embodiment, the at least one instruction may be configured to, when executed by the controller, cause the autonomous driving control apparatus to attenuate an amount of motor control used to perform the steering control of the host vehicle to follow the required steering angle, based on the amount of adjusted control attenuation, and perform the steering control of the host vehicle, based on the amount of attenuated motor control.

According to an embodiment, the at least one instruction may be configured to, when executed by the controller, cause the autonomous driving control apparatus to attenuate the torque sensor value by an attenuation ratio identified based on the amount of adjusted control attenuation and perform the steering control of the host vehicle based further on the attenuated torque sensor value.

According to an embodiment, the at least one instruction may be configured to, when executed by the controller, cause the autonomous driving control apparatus to adjust the amount of control attenuation to any one value within a specified range, based on the torque sensor value, and determine the attenuation ratio generated by subtracting the amount of adjusted control attenuation from a specified value.

According to an embodiment, the autonomous driving control apparatus may further include a sensor device. In one embodiment, the at least one instruction may be configured to, when executed by the controller, cause the autonomous driving control apparatus to determine driving environment information of the host vehicle using the sensor device and reduce the amount of control attenuation, when identifying a situation of having to hand over control authority for the host vehicle to a user based on the driving environment information.

According to an embodiment, the at least one instruction may be configured to, when executed by the controller, cause the autonomous driving control apparatus to identify sensing information including at least one of biometric information of a user, internal information of the host vehicle, or driving environment information of the host vehicle, or any combination thereof, using the sensor device, determine whether the user required torque is based on an intention of the user, based on at least a portion of the sensing information, and stop adjusting the amount of control attenuation when it is determined that the user required torque is not based on the intention.

According to an embodiment, the at least one instruction may be configured to, when executed by the controller, cause the autonomous driving control apparatus to stop the steering control based on the required steering angle, when the amount of control attenuation is adjusted to correspond to a minimum value in a predetermined range, and perform the steering control based on the user required torque.

According to another aspect of the present disclosure, an autonomous driving control method may include determining, by a controller, a user required torque received through a steering device, while controlling a host vehicle based on a required steering angle, determining, by the controller, a torque sensor value corresponding to the user required torque, using the steering device, adjusting, by the controller, an amount of control attenuation about a usage ratio between the required steering angle and the user required torque, based on the torque sensor value, and performing, by the controller, steering control of the host vehicle, based on at least one of the required steering angle, the user required torque, or the amount of control attenuation, or any combination thereof.

According to an embodiment, the determining of the torque sensor value corresponding to the user required torque using the steering device, may include: determining, by the controller, the torque sensor value corresponding to the user required torque, using power steering of the steering device.

According to an embodiment, the determining of the torque sensor value corresponding to the user required torque, using the steering device may include: determining, by the controller, a vehicle speed of the host vehicle and determining, by the controller, the torque sensor value by means of a torque map previously stored in a memory, based on the user required torque and the vehicle speed.

According to an embodiment, the adjusting of the amount of control attenuation about the usage ratio between the required steering angle and the user required torque based on the torque sensor value signal may include: adjusting, by the controller, the amount of control attenuation to be inversely proportional to the torque sensor value.

According to an embodiment, the performing of the steering control of the host vehicle based on the at least one of the required steering angle, the user required torque, or the amount of control attenuation, or the any combination thereof may include: attenuating, by the controller, an amount of motor control used to perform the steering control of the host vehicle to follow the required steering angle, based on the amount of adjusted control attenuation, and performing, by the controller, the steering control of the host vehicle, based on the amount of attenuated motor control.

According to an embodiment, the performing of the steering control of the host vehicle based on the at least one of the required steering angle, the user required torque, or the amount of control attenuation, or the any combination thereof may further include: attenuating, by the controller, the torque sensor value by an attenuation ratio identified based on the amount of adjusted control attenuation and performing, by the controller, the steering control of the host vehicle based further on the attenuated torque sensor value.

According to an embodiment, the autonomous driving control method may further include: adjusting, by the controller, the amount of control attenuation to any one value within a specified range, based on the torque sensor value; and determining, by the controller, the attenuation ratio generated by subtracting the amount of adjusted control attenuation from a specified value.

According to an embodiment, the autonomous driving control method may further include: determining, by the controller, driving environment information of the host vehicle using a sensor device; and reducing, by the controller, the amount of control attenuation, when identifying a situation of having to hand over control authority for the host vehicle to a user based on the driving environment information.

According to an embodiment, the autonomous driving control method may further include: identifying, by the controller, sensing information including at least one of biometric information of a user, internal information of the host vehicle, or driving environment information of the host vehicle, or any combination thereof, using a sensor device; determining, by the controller, whether the user required torque is based on an intention of the user, based on at least a portion of the sensing information; and not adjusting the amount of control attenuation, when it is determined that the user required torque is not based on the intention.

According to an embodiment, the autonomous driving control method may further include: stopping, by the controller, the steering control based on the required steering angle, when the amount of control attenuation is adjusted to correspond to a minimum value in a predetermined range; and performing, by the controller, the steering control based on the user required torque.

BRIEF DESCRIPTION OF THE DRAWINGS

The above and other objects, features and advantages of the present disclosure should be more apparent from the following detailed description taken in conjunction with the accompanying drawings:

FIG. 5 is a flowchart of an autonomous driving control method according to an embodiment of the present disclosure;

Figure 1:
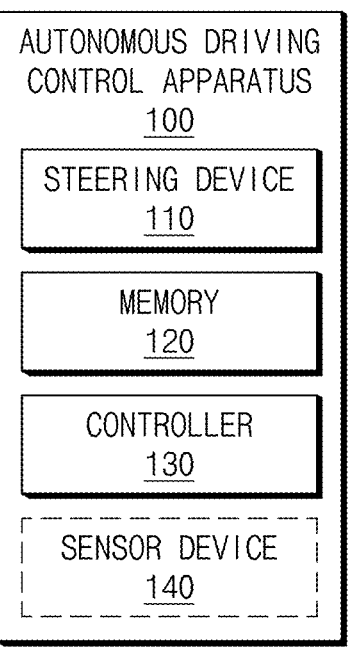
FIG. 1 is a block diagram illustrating components of an autonomous driving control apparatus according to an embodiment of the present disclosure.

With regard to description of drawings, the same or similar denotations may be used for the same or similar components.

DETAILED DESCRIPTION

Hereinafter, some embodiments of the present disclosure are described in detail with reference to the exemplary drawings. In the drawings, the same reference numerals are used throughout to designate the same or equivalent components. In addition, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It should be understood that terms used herein should be interpreted as having a meaning that is consistent with their meaning in the context of this disclosure and the relevant art and should not be interpreted in an idealized or overly formal sense unless expressly so defined herein. When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-6.

FIG. 1 is a block diagram illustrating components of an autonomous driving control apparatus according to an embodiment of the present disclosure.

According to an embodiment, an autonomous driving control apparatus 100 may include at least one of a steering device 110, a memory 120, a controller 130, or a sensor device 140, or any combination thereof. The components of the autonomous driving control apparatus 100, which are shown in FIG. 1, are illustrative, and embodiments of the present disclosure are not limited thereto. For example, the autonomous driving control apparatus 100 may further include components (e.g., at least one of an interface, a communication device, or a display, or any combination thereof) which are not shown in FIG. 1.

According to an embodiment, the steering device 110 may include at least one component for steering control of a host vehicle. For example, the steering device 110 may include at least one of a steering angle controller, a user intervention determination device, a user power steering controller, or a driving device controller, or any combination thereof.

Furthermore, an operation of the steering device 110, which is described below, may be an operation performed alone by the steering device 110, but may be an operation performed by the controller 130, as at least a part of the steering device 110 and the controller 130 are implemented as one chipset.

In one embodiment, the steering device 110 may include a motor driven power steering (MDPS) system and/or an electric power steering (EPS).

For example, the steering device 110 may receive a user input from a user and may determine (or identify) a user required torque based on the user input. For example, the steering device 110 may determine (or identify) a user required torque corresponding to a user input to a steering wheel.

In one embodiment, the steering device 110 may include a power steering system that may determine (or identify) a torque sensor value using the user required torque determined based on the user input.

A detailed description of components included in the steering device 110 is replaced with a description of FIG. 2, which is described below.

According to an embodiment, the memory 120 may store a command or data. For example, the memory 120 may store one or more instructions, when executed by the controller 130, causing the autonomous driving control apparatus 100 to perform various operations.

In one form, the memory 120 and the controller 130 may be implemented as one chipset. The controller 130 may include at least one of a communication processor or a modem.

For example, the memory 120 may store various pieces of information associated with the autonomous driving control apparatus 100. As an example, the memory 120 may store information about an operation history of the controller 130. In one embodiment, the memory 120 may store information about states and/or operations of components (e.g., at least one of an engine control unit (ECU), the steering device 110, the controller 130, or the sensor device 140, or any combination thereof) of the host vehicle.

According to an embodiment, the controller 130 may be operatively connected with the steering device 110, the memory 120, and/or the sensor device 140. For example, the controller 130 may control operations of the steering device 110, the memory 120, and/or the sensor device 140.

In one embodiment, the controller 130 may control the host vehicle based on a required steering angle. The required steering angle may correspond to an amount of control identified for steering control of the host vehicle by the controller 130 while the controller 130 performs autonomous driving control for the host vehicle.

As an example, the controller 130 may identify (or generate, determine) an amount of motor control corresponding to the required steering angle, using the steering device 110. For example, the amount of motor control may be an amount of control used to perform steering control of the host vehicle to follow the required steering angle.

For example, while performing the autonomous driving control (or while controlling the host vehicle based on the required steering angle), the controller 130 may determine (or identify) a user required torque received through the steering device 110.

In one embodiment, the controller 130 may determine (or identify) a torque sensor value corresponding to the user required torque, using the steering device 110. As an example, the torque sensor value may be an amount of control actually input to a driving device (e.g., a motor) to control the driving device.

As an example, the controller 130 may determine (or identify) a torque sensor value corresponding the user required torque, using the power steering of the steering device 110.

As an example, the controller 130 may determine (or identify) a torque sensor value by means of a torque map previously stored in the memory 120, based on the user required torque and the vehicle speed.

In one embodiment, the controller 130 may adjust an amount of control attenuation about a usage ratio between the required steering angle and the user required torque, based on a magnitude of the torque sensor value.

As an example, the controller 130 may adjust the amount of control attenuation to be inversely proportional to the magnitude of the torque sensor value.

In one embodiment, the controller 130 may perform steering control of the host vehicle based on at least one of the required steering angle, the user required torque, or the amount of control attenuation, or any combination thereof.

In another embodiment, the controller 130 may perform steering control of the host vehicle based on a torque value identified by multiplying a torque value determined based on the required steering angle, which is identified to perform steering control based on the required steering angle, by the amount of control attenuation.

In one embodiment, the controller 130 may attenuate the torque sensor value by an attenuation ratio identified based on the amount of adjusted control attenuation and may then perform the steering control of the host vehicle based further on the attenuated torque sensor value. The amount of control attenuation and/or the attenuation ratio may be one of certain real values from "0" to "1".

As an example, the controller 130 may attenuate an amount of motor control used to perform steering control of the host vehicle to follow the required steering angle, based on the amount of adjusted control attenuation and may then perform the steering control of the host vehicle based on the amount of attenuated motor control.

As an example, the controller 130 may adjust the amount of control attenuation to any one value within a specified range based on the magnitude of the torque sensor value. The specified range may include, for example, a range between "0" and "1".

As an example, the controller 130 may determine (or identify) an attenuation ratio generated by subtracting the amount of adjusted control attenuation from a specified value. For example, the specified value may be, for example, "1". For example, when the amount of adjusted control attenuation is 0.3, the attenuation ratio may be 0.7. In other words, the sum of the amount of control attenuation and the attenuation ratio may be "1". However, the above-mentioned numerical values are illustrative for convenience of description, and embodiments of the present disclosure are not limited thereto.

According to an embodiment, the sensor device 140 may obtain (or identify) various pieces of information (e.g., sensing information including at least one of biometric information of the user, internal information of the host vehicle, or driving environment information of the host vehicle, or any combination thereof) used for driving of the host vehicle.

For example, the sensor device 140 may include at least one sensor including at least one of a camera, radio detection and ranging (RADAR), or light detection and ranging (Li-DAR), or any combination thereof.

For example, the sensor device 140 may determine (or identify) driving environment information including information about at least one of a driving speed of the host vehicle, driving acceleration of the host vehicle, a driving direction of the host vehicle, a destination of the host vehicle, a driving route of the host vehicle, a driving mode of the host vehicle, a road of the host vehicle, or an area adjacent to the host vehicle, or any combination thereof.

As an example, the controller 130 may identify a situation of having to hand over control authority for the host vehicle to the user, based on the driving environment information identified by means of the sensor device 140. The above-mentioned situation may include a problem situation including at least one of a situation in which there is a possibility that the host vehicle will collide with an external object (e.g., another vehicle), a situation in which the external object is approaching the host vehicle, or a situation in which a problem occurs in at least a portion of driving performance and/or a component of the host vehicle, or any combination thereof.

For example, the sensor device 140 may identify biometric information of the user, which includes information about at least one of a face of the user, a body of the user, motion of the user, eye blinking of the user, or any combination thereof.

For example, the sensor device 140 may identify internal information of the host vehicle, which includes information about at least one of an internal temperature of the host vehicle, humidity of the host vehicle, a user who is riding in the host vehicle, or a door open state of the host vehicle, or any combination thereof.

As an example, the controller 130 may determine whether a user required torque for the steering device 110 is based on an intention of the user, based on at least one of the biometric information of the user, the internal information of the host vehicle, or the driving environment information of the host vehicle, which is identified by means of the sensor device 140, or any combination thereof. In other words, the controller 130 may determine whether the user intentionally performs an input to the steering device 110.

For example, when identifying the driving environment information of the host vehicle using the sensor device 140 and identifying the situation of having to hand over the control authority for the host vehicle to the user based on the driving environment information, the controller 130 may reduce the amount of control attenuation.

For example, the controller 130 may identify sensing information including at least one of the biometric information of the user, the internal information of the host vehicle, or the driving environment information of the host vehicle, or any combination thereof, using the sensor device 140. The controller 130 may determine whether the user required torque is based on an intention of the user based on, for example, at least a portion of the sensing information. For example, when it is determined that the user required torque is not based on the intention, the controller 130 may not adjust the amount of control attenuation.

For example, when the amount of control attenuation is adjusted to correspond to a minimum value (e.g., "0") within a predetermined range, the controller 130 may stop steering control based on the required steering angle and may perform steering control based on the user required torque. In other words, the controller 130 may stop steering control based on autonomous driving control and may perform steering the control based on the user required torque. In other words, the controller 130 may hand over autonomous driving control authority about steering control to the user.

Figure 2:
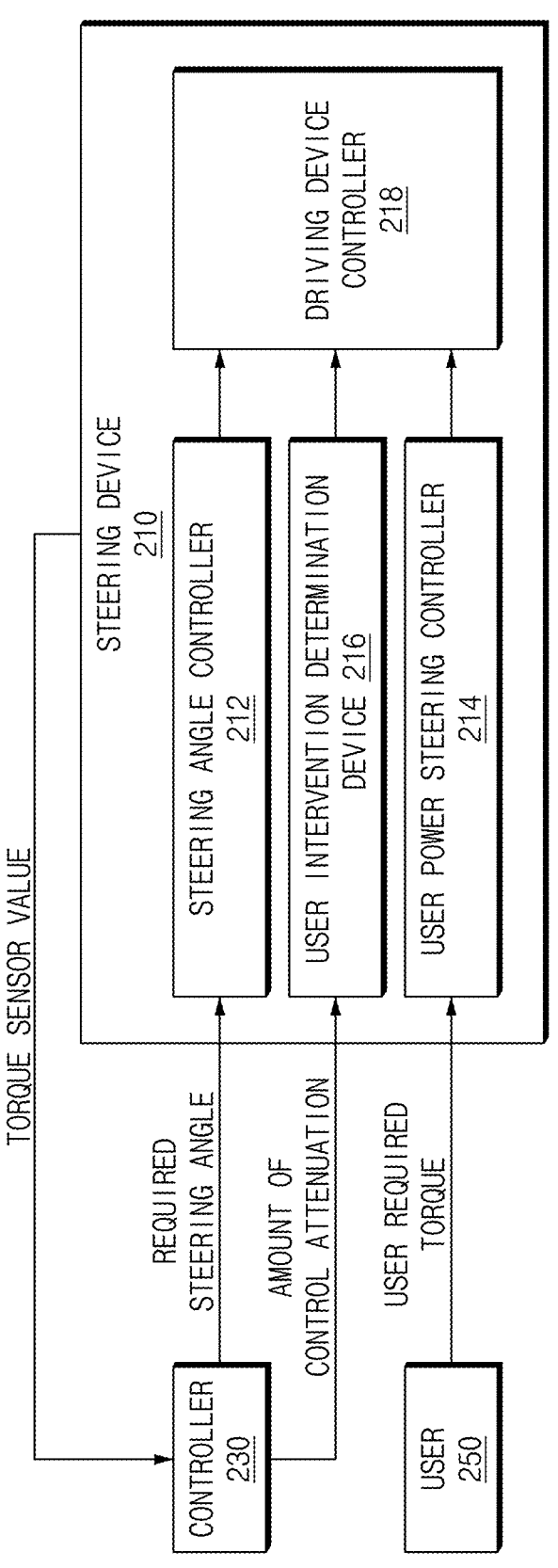
FIG. 2 is a block diagram illustrating components of an autonomous driving control apparatus according to an embodiment of the present disclosure.

FIG. 2 is a block diagram illustrating components of an autonomous driving control apparatus according to an embodiment of the present disclosure.

According to an embodiment, an autonomous driving control apparatus (e.g., an autonomous driving control apparatus 100 of FIG. 1) may include a steering device 210 and/or a controller 230 (e.g., a controller 130 of FIG. 1).

The structure of the components shown in FIG. 2 is illustrative, and embodiments of the present disclosure are not limited thereto. For example, at least some of the components included in the steering device 210 in FIG. 2 may be implemented together with the controller 230 as one chip. In other words, at least some of operations of the steering device 210, which are described below, may be performed by the controller 230 (or control of the controller 230).

For example, the controller 230 may deliver a required steering angle to the steering device 210 (or a steering angle controller 212). As an example, the controller 230 may identify a required steering angle used for steering control of a host vehicle while performing autonomous driving control for the host vehicle and may deliver the identified required steering angle to the steering angle controller 212 included in the steering device 210.

For example, the steering device 210 may perform control logic for driving a driving device (e.g., a motor), using the required steering angle delivered using the steering angle controller 212. The steering angle controller 212 may deliver, for example, the result derived by means of the control logic (e.g., required steering angle following logic corresponding to the required steering angle) to a driving device controller 218.

For example, the steering device 210 may receive a user required torque from a user 250. As an example, the steering device 210 may identify a user required torque corresponding to a user input to an input device (e.g., a steering wheel). In other words, the user required torque may be a torque corresponding to a user input which is input for intervention in steering control by the user 250 while the host vehicle is traveling based on autonomous driving control.

For example, the steering device 210 may perform control logic for driving the driving device, using user required torque delivered through a user power steering controller 214 (or power steering). The user power steering controller 214 may deliver, for example, the result derived by means of the control logic (e.g., a torque sensor value corresponding to the user required torque) to the driving device controller 218.

For example, the driving device controller 218 may deliver at least some of parameters which are in use to control the driving device to the controller 230. The driving device controller 218 may deliver, for example, the torque sensor value corresponding to the user required torque to the controller 230.

For example, the controller 230 may adjust an amount of control attenuation based on the delivered torque sensor value and may deliver the amount of adjusted control attenuation to a user intervention determination device 216.

As an example, the controller 230 may adjust an amount of control attenuation about a usage ratio between the required steering angle and the user required torque, based on a magnitude of the torque sensor value.

As an example, the controller 230 may adjust the amount of control attenuation to be inversely proportional to the magnitude of the torque sensor value. The controller 230 may adjust the amount of control attenuation to any one value within a specified range. The specified range may include, for example, a range between "0" and "1". In other words, the amount of control attenuation may be any real value between "0" and "1".

For example, the controller 230 may further identify an attenuation ratio using the amount of control attenuation and may deliver the attenuation ratio to the steering device 210.

As an example, the controller 230 may identify a value obtained by subtracting the amount of control attenuation from a specified value (e.g., "1") as the attenuation ratio. In other words, the sum of the amount of control attenuation and the attenuation ratio may be a specified value.

For example, the steering device 210 may perform steering control of the host vehicle, using each of the amount of control attenuation and the attenuation ratio, which are delivered.

As an example, the steering device 210 may attenuate an amount of motor control used to perform steering control for the host vehicle to follow the required steering angle to travel, based on the amount of adjusted control attenuation, using the driving device controller 218, and may then perform steering control of the host vehicle based on the amount of attenuated motor control.

As an example, the steering device 210 may attenuate the torque sensor value by the attenuation ratio identified based on the amount of adjusted control attenuation, using the driving device controller 218, and may then perform the steering control of the host vehicle based further on the attenuated torque sensor value.

As an example, when the amount of control attenuation is "0" (e.g., when the attenuation ratio is "1"), the steering device 210 may perform steering control of the host vehicle using only the torque sensor value. As another example, when the attenuation ratio is "0" (e.g., when the amount of control attenuation is "1"), the steering device 210 may perform steering control of the host vehicle using only the required steering angle.

Figure 3:
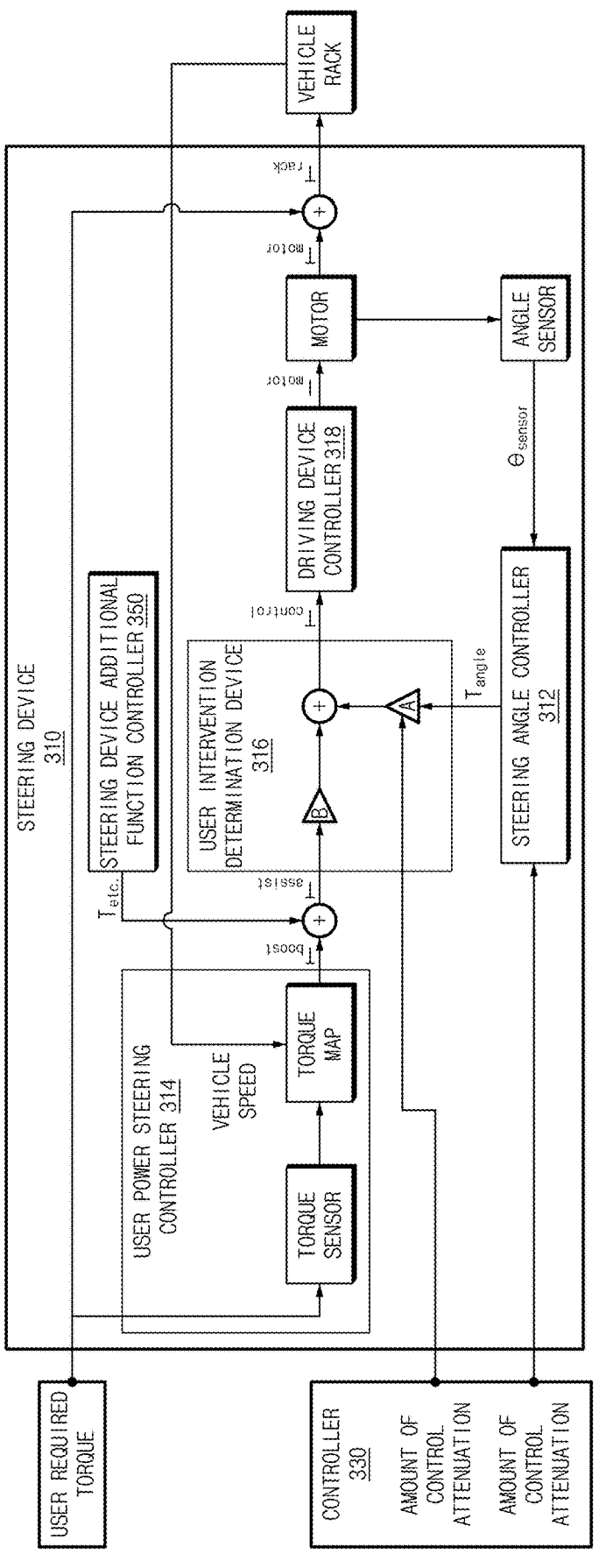
FIG. 3 is a block diagram illustrating components of an autonomous driving control apparatus according to an embodiment of the present disclosure.

FIG. 3 is a block diagram illustrating components of an autonomous driving control apparatus according to an embodiment of the present disclosure.

According to an embodiment, an autonomous driving control apparatus (e.g., an autonomous driving control apparatus 100 of FIG. 1) may include a steering device 310 (e.g., a steering device 110 of FIG. 1) and/or a controller 330 (e.g., a controller 130 of FIG. 1).

For example, the autonomous driving control apparatus may adjust (or generate) an amount A of control attenuation using the controller 330, based on a torque sensor value delivered from the steering device 310 to the controller 330.

For example, the controller 330 may deliver the amount A of control attenuation to a user intervention determination device 316.

For example, the controller 330 may deliver a required steering angle to a steering angle controller 312. For example, the steering angle controller 312 may identify an amount of steering control (e.g., a steering angle torque $T_{angle}$) for autonomous driving control using a motor sensing angle $\theta_{sensor}$ delivered from an angle sensor for sensing a motor and the required steering angle and may deliver the amount of steering control to the user intervention determination device 316.

For example, the user intervention determination device 316 may multiply the steering angle torque $T_{angle}$ and the amount A of control attenuation. As an example, the steering angle torque $T_{angle}$ may be reduced or maintained due to calculation with the amount A of control attenuation.

For example, the autonomous driving control apparatus may identify a torque sensor value using a user required torque received from a user.

For example, the autonomous driving control apparatus may identify a torque sensor value corresponding to the user required torque, using a user power steering controller 314.

As an example, the power steering the controller 314 may identify the torque sensor value corresponding the user required torque, using power steering included in the steering device 310.

As an example, the user power steering controller 314 may identify a vehicle speed of the host vehicle and may identify a torque sensor value by means of a torque map previously stored in a memory, further using the user required torque and the vehicle speed.

For example, the autonomous driving control apparatus may deliver a user torque $T_{assist}$, generated by adding a torque (e.g., a torque sensor value $T_{boost}$) output from the user power steering controller 314 to a torque (e.g., other torque $T_{torque}$) delivered to operate an additional function of the steering device 310 from a steering device additional function controller 350, to the user intervention determination device 316.

As an example, the autonomous driving control apparatus may multiply the user torque $T_{assist}$ by an attenuation ratio B obtained by subtracting an amount A of control attenuation from a specified value (e.g., "1"). As an example, the user torque $T_{assist}$ may be reduced or maintained due to calculation with the amount A of control attenuation.

For example, the autonomous driving control apparatus may add torques identified respectively using the amount A of control attenuation and the attenuation ratio B by the user intervention determination device 316 to identify a control torque $T_{control}$ and may deliver the control torque $T_{control}$ to a driving device controller 318.

For example, the driving device controller 318 may identify a required current $I_{motor}$ required for operation of a motor in response to the control torque $T_{control}$ and may control the motor based on the identified required current $I_{motor}$.

For example, the steering device 310 may add an operating torque $I_{motor}$ of the motor which is operating to a rack torque Track of a rack (or a rack gear) included in the vehicle and may deliver the added torque to the rack.

Figure 4:
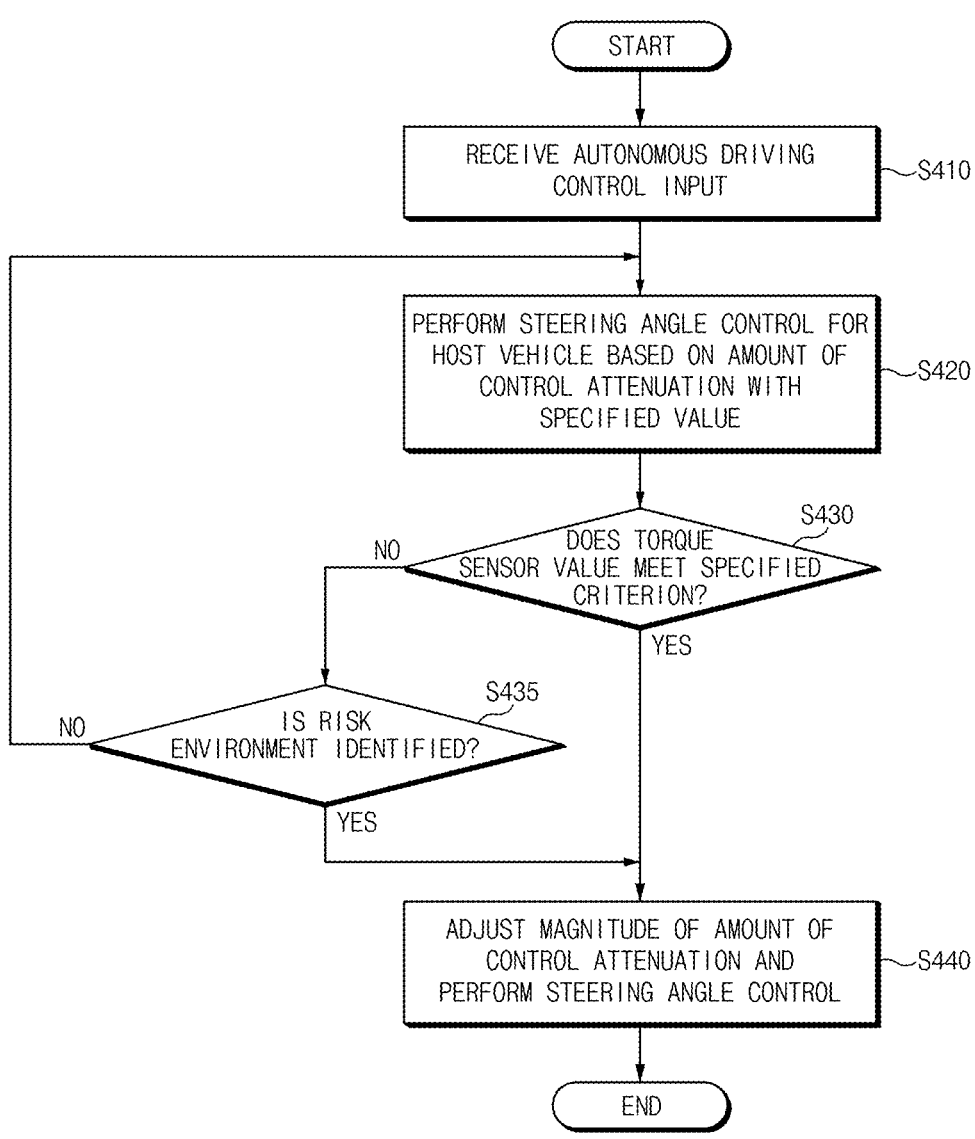
FIG. 4 is an operational flowchart of an autonomous driving control apparatus according to an embodiment of the present disclosure.

FIG. 4 is an operational flowchart of an autonomous driving control apparatus according to an embodiment of the present disclosure.

According to an embodiment, an autonomous driving control apparatus (e.g., an autonomous driving control apparatus 100 of FIG. 1) may perform operations disclosed in FIG. 4. For example, at least some of components (e.g., a steering device 110, a memory 120, a controller 130, and/or a sensor device 140 of FIG. 1) included in the autonomous driving control apparatus may be configured to perform the operations of FIG. 4.

Operations in S410 to S440 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 4, may be briefly described or omitted.

According to an embodiment, in S410, the autonomous driving control apparatus may receive an autonomous driving control input.

For example, when a user input (e.g., a touch input or a pressure input) to a specified area (e.g., a button) in a host vehicle is identified, the autonomous driving control apparatus may recognize that an input for autonomous driving control is received and may start autonomous driving control for a host vehicle.

According to an embodiment, in S420, the autonomous driving control apparatus may perform steering angle control for the host vehicle based on an amount of control attenuation with a specified value.

For example, the initial value of the amount of control attenuation may be a predetermined value or a setting value changeable by a user.

According to an embodiment, in S430, the autonomous driving control apparatus may determine whether a torque sensor value meets a specified criterion.

For example, when the torque sensor value is out of a specified range, the autonomous driving control apparatus may determine that the torque sensor value meets the specified criterion. In other words, as the torque sensor value is out of the specified range, the autonomous driving control apparatus may identify that the user is able to experience a reaction force and may determine that the torque sensor value meets the specified criterion for adjusting a magnitude of the amount of control attenuation.

For example, when the torque sensor value meets the specified criterion (e.g., S430—YES), the autonomous driving control apparatus may perform S440.

For example, when the torque sensor value does not meet the specified criterion (e.g., S430—NO), the autonomous driving control apparatus may perform S435.

According to an embodiment, in S435, the autonomous driving control apparatus may identify whether a driving environment of the host vehicle corresponds to a risk environment.

For example, the autonomous driving control apparatus may identify driving environment information of the host vehicle and may identify whether there is a situation of having to hand over control authority for the host vehicle to the user based on the driving environment information.

For example, when the driving environment of the host vehicle corresponds to the risk environment (e.g., S435—YES), the autonomous driving control apparatus may perform S440.

For example, when the driving environment of the host vehicle does not correspond to the risk environment (e.g., S435—NO), the autonomous driving control apparatus may repeatedly perform S420.

According to an embodiment, in S440, the autonomous driving control apparatus may adjust the magnitude of the amount of control attenuation and may perform steering angle control.

For example, the autonomous driving control apparatus may adjust the magnitude of the amount of control attenuation to any one value within a specified range. As an example, the autonomous driving control apparatus may adjust the magnitude of the amount of control attenuation to one of certain values between "0" and "1". As an example, the autonomous driving control apparatus may reduce the magnitude of the amount of control attenuation.

For example, the autonomous driving control apparatus may perform steering control of the host vehicle according to autonomous driving control, based on a result calculated by multiplying the amount of adjusted control attenuation by a steering control parameter for autonomous driving control, which is identified in response to a required steering angle.

FIG. 5 is a flowchart of an autonomous driving control method according to an embodiment of the present disclosure.

According to an embodiment, an autonomous driving control apparatus (e.g., an autonomous driving control apparatus 100 of FIG. 1) may perform operations disclosed in FIG. 5. For example, at least some of components (e.g., a steering device 110, a memory 120, a controller 130, and/or a sensor device 140 of FIG. 1) included in the autonomous driving control apparatus may be configured to perform the operations of FIG. 5.

Operations in S510 to S540 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

According to an embodiment, in S510, the autonomous driving control apparatus may identify a user required torque received through a steering device, while controlling a host vehicle based on a required steering angle.

For example, the autonomous driving control apparatus may identify a user required torque identified based on a user input (e.g., a rotational input) to a steering wheel.

According to an embodiment, in S520, the autonomous driving control apparatus may generate (or identify) a torque sensor value corresponding to the user required torque, using the steering device.

For example, the autonomous driving control apparatus may identify the torque sensor value corresponding to the user required torque, using power steering included in the steering device.

For example, the autonomous driving control apparatus may identify a vehicle speed of the host vehicle and may identify a torque sensor value by means of a torque map previously stored in a memory, based on the user required torque and the vehicle speed.

According to an embodiment, in S530, the autonomous driving control apparatus may adjust an amount of control attenuation about a usage ratio between the required steering angle and the user required torque, based on a magnitude of the torque sensor value.

For example, the autonomous driving control apparatus may adjust the amount of control attenuation to be inversely proportional to the magnitude of the torque sensor value.

For example, autonomous driving control may adjust the amount of control attenuation to any one value within a specified range, based on the magnitude of the torque sensor value. As an example, the autonomous driving control apparatus may adjust the amount of control attenuation to one of values between "0" and "1".

As an example, the autonomous driving control apparatus may identify an attenuation ratio generated by subtracting the amount of adjusted control attenuation from a specified value.

For example, even when already adjusting the amount of control attenuation based on the magnitude of the torque sensor value or even when determining that there is no need to adjust the amount of control attenuation, when identifying a situation of having to hand over control authority for the host vehicle to a user based on driving environment information identified using a sensor device, the autonomous driving control apparatus may reduce the amount of control attenuation.

For example, even when determining to adjust the amount of control attenuation based on the magnitude of the torque sensor value, the autonomous driving control apparatus may determine whether the user required torque is based on an intention of the user, based on at least a portion of sensing information (e.g., at least one of biometric information of the user, internal information of the host vehicle, or driving environment information of the host vehicle, or any combination thereof) identified using a sensor device. When it is determined the user required torque is not based on the intention, the autonomous driving control apparatus may stop adjusting the amount of control attenuation.

According to an embodiment, In S540, the autonomous driving control apparatus may perform steering control of the host vehicle based on at least one of the required steering angle, the user required torque, or the amount of control attenuation, or any combination thereof.

For example, the autonomous driving control apparatus may attenuate an amount of motor for controlling steering of the host vehicle to follow the required steering angle, based on the amount of adjusted control attenuation, and may then perform steering control of the host vehicle based on the amount of attenuated motor control.

For example, the autonomous driving control apparatus may attenuate the torque sensor value by means of an attenuation ratio identified based on the amount of adjusted control attenuation and may then perform steering control of the host vehicle based further on the attenuated torque sensor value.

Figure 6:
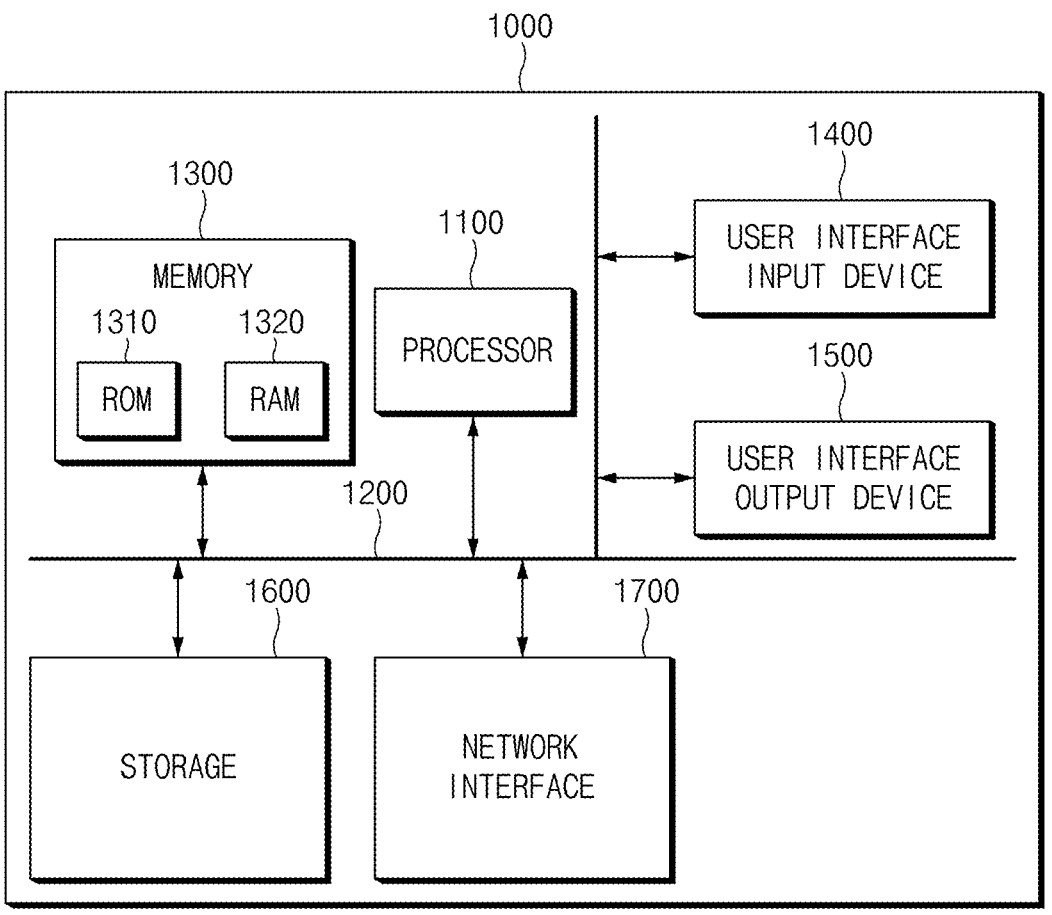
FIG. 6 illustrates a computing system about an autonomous driving control method according to an embodiment of the present disclosure.

FIG. 6 illustrates a computing system about an autonomous driving control method according to an embodiment of the present disclosure.

Referring to FIG. 6, a computing system 1000 about the autonomous driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random-Access Memory (RAM) 1320.

Accordingly, the operations of the method or algorithm described in connection with the embodiments disclosed in the specification may be directly implemented with a hardware module, a software module, or a combination thereof, which is executed by the processor 1100. The software module may reside on a storage medium (that is, the memory 1300 and/or the storage 1600) such as a RAM, a flash memory, a ROM, an erasable programmable ROM (EPROM), an electrically erasable programmable ROM (EEPROM), a register, a hard disc, a removable disk, and a compact-disc ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the autonomous driving control apparatus and the method thereof according to an embodiment of the present disclosure.

According to at least one of embodiments of the present disclosure, the autonomous driving control apparatus may perform steering angle control, thus performing more accurate and minute steering control than when performing control based on torque.

Furthermore, according to at least one of embodiments of the present disclosure, the autonomous driving control apparatus may set a control amount usage ratio between steering angle control based on an amount of control attenuation identified using a torque sensor value and steering control by the user, thus reducing a sense of difference the user is able to feel when performing intervention in the vehicle.

Furthermore, according to at least one of embodiments of the present disclosure, the autonomous driving control apparatus may perform steering control based on the amount of control attenuation, thus relatively easily handing over control authority for the host vehicle (e.g., control authority for steering control) to the user.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those of ordinary skill in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed based on the accompanying claims, and all the technical ideas within the scope equivalent to the claims should be included in the scope of the present disclosure.

What is claimed is:

1. An autonomous driving control apparatus, comprising:
a steering device;
a memory storing at least one instruction; and
a controller operatively connected with the steering device and the memory,
wherein the at least one instruction is configured to, when executed by the controller, cause the autonomous driving control apparatus to:
determine a user required torque received through the steering device, while controlling a host vehicle based on a required steering angle;
determine a torque sensor value corresponding to the user required torque, using the steering device;
adjust, based on the torque sensor value, an amount of control attenuation related to a ratio indicating a degree to which the required steering angle and the user required torque are respectively weighted in steering control; and
perform the steering control of the host vehicle, based on the adjusted amount of control attenuation.

2. The autonomous driving control apparatus of claim 1, wherein the at least one instruction is configured to, when executed by the controller, cause the autonomous driving control apparatus to:
determine the torque sensor value corresponding to the user required torque, using power steering of the steering device.

3. The autonomous driving control apparatus of claim 1, wherein the at least one instruction is configured to, when executed by the controller, cause the autonomous driving control apparatus to:
determine a vehicle speed of the host vehicle; and
determine the torque sensor value by a torque map stored in the memory, based on the user required torque and the vehicle speed.

4. The autonomous driving control apparatus of claim 1, wherein the at least one instruction is configured to, when executed by the controller, cause the autonomous driving control apparatus to:
adjust the amount of control attenuation to be inversely proportional to the torque sensor value.

5. The autonomous driving control apparatus of claim 1, wherein the at least one instruction is configured to, when executed by the controller, cause the autonomous driving control apparatus to:
attenuate an amount of motor control used to perform the steering control of the host vehicle to follow the required steering angle based on the amount of adjusted control attenuation, and
perform the steering control of the host vehicle based on the amount of attenuated motor control.

6. The autonomous driving control apparatus of claim 5, wherein the at least one instruction is configured to, when executed by the controller, cause the autonomous driving control apparatus to:

attenuate the torque sensor value by an attenuation ratio identified based on the amount of adjusted control attenuation and perform the steering control of the host vehicle based further on the attenuated torque sensor value.

7. The autonomous driving control apparatus of claim 6, wherein the at least one instruction is configured to, when executed by the controller, cause the autonomous driving control apparatus to:

adjust the amount of control attenuation to any one value within a specified range, based on the torque sensor value; and determine the attenuation ratio generated by subtracting the amount of adjusted control attenuation from a specified value.

8. The autonomous driving control apparatus of claim 1, further comprising:

a sensor device, wherein the at least one instruction is configured to, when executed by the controller, cause the autonomous driving control apparatus to:

determine driving environment information of the host vehicle using the sensor device; and reduce the amount of control attenuation, when identifying a situation of having to hand over control authority for the host vehicle to a user based on the driving environment information.

9. The autonomous driving control apparatus of claim 1, further comprising:

a sensor device, wherein the at least one instruction is configured to, when executed by the controller, cause the autonomous driving control apparatus to:

identify sensing information including at least one of biometric information of a user, internal information of the host vehicle, or driving environment information of the host vehicle, or any combination thereof, using the sensor device;

determine whether the user required torque is based on an intention of the user, based on at least a portion of the sensing information; and stop adjusting the amount of control attenuation, when it is determined that the user required torque is not based on the intention.

10. The autonomous driving control apparatus of claim 1, wherein the at least one instruction is configured to, when executed by the controller, cause the autonomous driving control apparatus to:

stop the steering control based on the required steering angle, when the amount of control attenuation is adjusted to correspond to a minimum value in a predetermined range, and perform the steering control based on the user required torque.

11. An autonomous driving control method, comprising:

determining, by a controller, a user required torque received through a steering device, while controlling a host vehicle based on a required steering angle;

determining, by the controller, a torque sensor value corresponding to the user required torque, using the steering device;

adjusting, based on the torque sensor value, by the controller, an amount of control attenuation related to a ratio indicating a degree to which the required steering angle and the user required torque are respectively weighted in steering control; and performing, by the controller, the steering control of the host vehicle, based on the adjusted amount of control attenuation.

12. The autonomous driving control method of claim 11, wherein determining the torque sensor value corresponding to the user required torque comprises:

determining the torque sensor value corresponding to the user required torque, using power steering included in the steering device.

13. The autonomous driving control method of claim 12, wherein determining the torque sensor value corresponding to the user required torque comprises:

determining a vehicle speed of the host vehicle; and determining the torque sensor value by means of a torque map previously stored in a memory, based on the user required torque and the vehicle speed.

14. The autonomous driving control method of claim 11, wherein adjusting the amount of control attenuation about the usage ratio comprises:

adjusting the amount of control attenuation to be inversely proportional to the torque sensor value.

15. The autonomous driving control method of claim 11, wherein performing the steering control of the host vehicle comprises:

attenuating an amount of motor control used to perform the steering control of the host vehicle to follow the required steering angle, based on the amount of adjusted control attenuation, and performing, by the controller, the steering control of the host vehicle, based on the amount of attenuated motor control.

16. The autonomous driving control method of claim 15, wherein performing the steering control of the host vehicle further includes:

attenuating, by the controller, the torque sensor value by an attenuation ratio identified based on the amount of adjusted control attenuation and performing, by the controller, the steering control of the host vehicle based further on the attenuated torque sensor value.

17. The autonomous driving control method of claim 16, further comprising:

adjusting, by the controller, the amount of control attenuation to any one value within a specified range, based on the torque sensor value; and determining, by the controller, the attenuation ratio generated by subtracting the amount of adjusted control attenuation from a specified value.

18. The autonomous driving control method of claim 11, further comprising:

determining, by the controller, driving environment information of the host vehicle using a sensor device; and reducing, by the controller, the amount of control attenuation, when identifying a situation of having to hand over control authority for the host vehicle to a user based on the driving environment information.

19. The autonomous driving control method of claim 11, further comprising:

identifying, by the controller, sensing information including at least one of biometric information of a user, internal information of the host vehicle, or driving environment information of the host vehicle, or any combination thereof, using a sensor device;

determining, based on the sensing information, whether the user required torque is based on an intention of the user; and not adjusting the amount of control attenuation, when it is determined that the user required torque is not based on the intention.

20. The autonomous driving control method of claim 11, further comprising:

stopping, by the controller, the steering control based on the required steering angle, when the amount of control attenuation is adjusted to correspond to a minimum value in a predetermined range, and performing, by the controller, the steering control based on the user required torque.

\* \* \* \* \*